Dec. 8, 1931.     R. HOTTEL     1,835,048

SEAT

Filed Dec. 12, 1927

INVENTOR.
RAY HOTTEL.
BY
*Irving Harness*
ATTORNEY.

Patented Dec. 8, 1931

1,835,048

UNITED STATES PATENT OFFICE

RAY HOTTEL, OF DETROIT, MICHIGAN, ASSIGNOR TO CHRYSLER CORPORATION, OF DETROIT, MICHIGAN, A CORPORATION OF DELAWARE

SEAT

Application filed December 12, 1927. Serial No. 239,280.

This invention relates to seats and more particularly to an adjustable seat back for use on an automobile.

It is desirable that the operator's seat back may be supported at various distances from the front edge of the seat to facilitate his reaching the various levers in front of the seat. With this object in view, the invention contemplates the provision of a horizontally movable cushion supported on the main seat back and adjustable by means of a handle within convenient reach of the operator.

Another object of the invention is to provide an adjusting means which permits slight vertical movement of the seat back cushion, when it is moved rearwardly, to remain in contact with the curved outline of the seat cushion at its rear edge, thus preventing an opening between the seat and seat back cushion at any of the adjusted positions.

A further object of the invention is to provide an extensible covering between the main seat back and the movable cushion.

Other objects and advantages will more fully appear from the following description taken in connection with the accompanying drawings in which.

Figure 1:
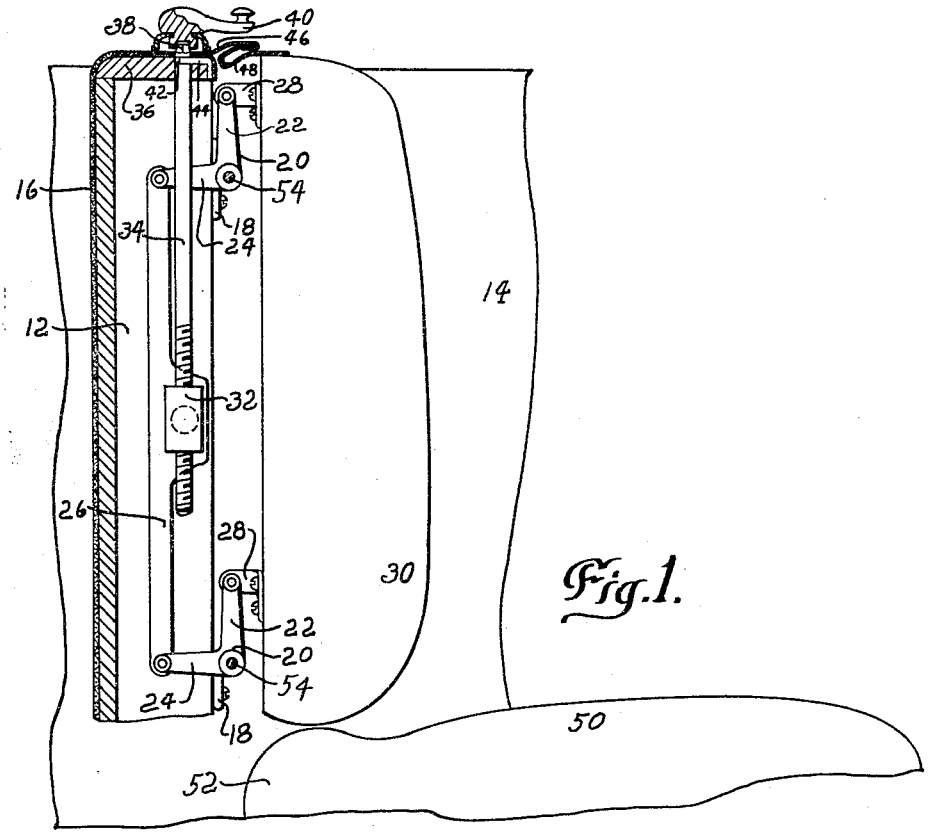
Fig. 1 is a vertical sectional view of the seat back showing an adaptation of my invention, some parts, including a seat cushion, being shown in elevation.

Referring to the drawings, a fixed seat back structure is shown as at 12, rigidly supported between the side walls 14 of an automobile body. The rear of the seat back is closed by upholstery 16. The front of the seat is open and the operating mechanism is shown secured to the front surface thereof, projecting rearwardly within the fixed seat back structure. Brackets 18 secured to the front surface of the seat back are adapted to receive pivoted bell cranks 20 each having an upwardly extending arm 22 and a rearwardly extending arm 24. Two bell cranks have been shown an upper and a lower one. A link 26 pivotally connects the outer ends of the arms 24 and brackets 28, secured to the seat back cushion 30, are pivotally secured to the outer ends of the arms 22.

Carried by the link 26 is a screwthreaded block 32 adapted to be pivoted thereon and to receive the screwthreaded end of a rod 34 extending vertically into the upper portion 36 of the seat back structure. The upper end of the rod 34 has a squared end 38, to receive a handle 40, and a groove 42 receives a bifurcated member 44 to axially position the rod 34.

The upper edge of the seat back is provided with a rigid flange 46 for closing the space between the seat back 12 and the cushion 30 when the cushion 30 is in partially extended position. A flexible member 48, such as upholstery material, has its one edge secured to the underside of the flange 46 and its opposite edge is secured to the edge of the cushion 30. When the cushion is in its rearward position the member 48 is folded between the cushion and flange 46 but may be drawn out by the cushion when the latter is in its forward position.

It will be understood that as the rod 34 is turned by the handle 40, the block 32 and link 26 move vertically, pivoting the bell cranks 20 which move the cushion horizontally. Due to the outer ends of the arms 22 moving in an arc, the cushion moves vertically at its extreme positions, but as the arms 22 are vertical when the cushion is in its central position, there is comparatively no vertical movement at that point. The seat cushion 50 has its upper rear corner curved as at 52; the radius of which is substantially equal to the length of the arm 22, and is located, with respect to the cushion 30, in a position such that the lower edge of cushion 30 is in engagement with the curved surface 52 throughout its curved path of movement, vertically and horizontally.

Figure 2:
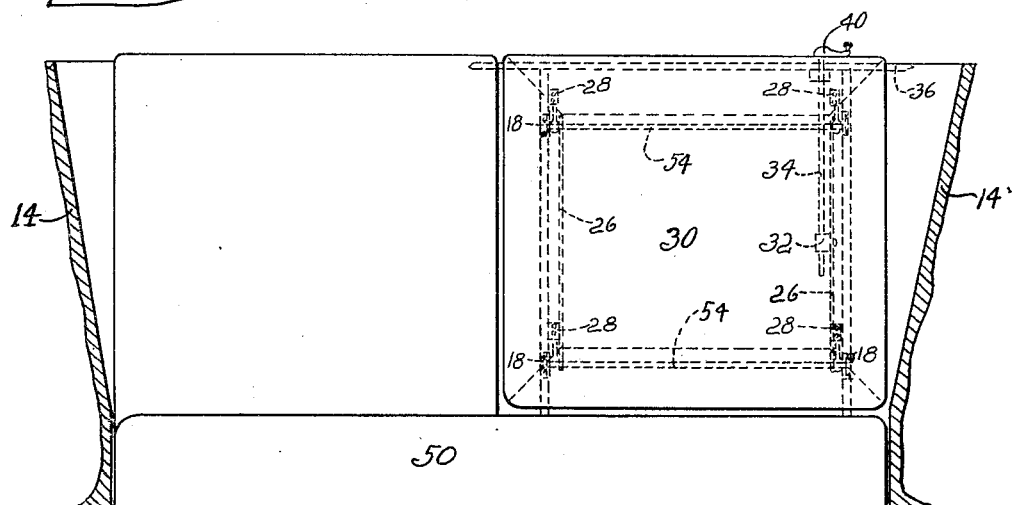
Fig. 2 is a front elevation of the seat back shown in Fig. 1.

In Fig. 2, I have shown bell cranks and connecting links at the two sides of the cushion, operated by a single rod and handle and the bell cranks are mounted on rods 54 extending horizontally from one side to the other.

It will be understood that while I have described and illustrated one particular embodiment of my invention, various changes including size, shape and arrangement of parts, may be made without departing from the spirit of my invention and it is not my intention to limit its scope other than by the terms of the appended claims.

What I claim is:

1. The combination with a vehicle seat and a fixed back, of a movable cushion located forward of said fixed back, bell cranks pivoted on said fixed back each having a horizontally and a vertically extended arm, a link connecting the horizontal arms of said bell cranks at fixed points, means for pivotally connecting the vertical arms on said cushion at fixed points, said means supporting said movable cushion, and a vertical rod positioned on said fixed back having one end in screwthreaded engagement with said link and its opposite end provided with a handle for rotating said rod to move said link vertically.

2. The combination with a vehicle seat and a fixed back, of a movable cushion located forward of said fixed back, a rigid flange secured to said fixed back extending over the edge of said cushion, and an extensible member having one edge secured to said flange and its other edge secured to said cushion for closing the space between the said fixed back and said cushion when the latter is extended forward from said fixed back.

3. The combination with a vehicle seat and a fixed back, of a movable cushion located forward of said fixed back, means for moving said cushion through a curved path, and a seat cushion having its rear upper corner curved to correspond with the line of travel of the lower end of said movable cushion, whereby the lower edge of the seat back is substantially in engagement with the lower edge of said cushion throughout the entire movement of said cushion.

RAY HOTTEL.